United States Patent [19]

Kajigaya

[11] Patent Number: 5,255,104
[45] Date of Patent: Oct. 19, 1993

[54] METHOD FOR DISPLAYING AMOUNT OF DOCUMENTS

[75] Inventor: Yasuhiro Kajigaya, Isehara, Japan

[73] Assignee: Fujitsu Limited, Kawasaki, Japan

[21] Appl. No.: 659,163

[22] Filed: Feb. 22, 1991

[30] Foreign Application Priority Data

Feb. 22, 1990 [JP] Japan ................... 2-039595

[51] Int. Cl.$^5$ .................. H04N 1/40; G03G 15/00
[52] U.S. Cl. ..................... 358/403; 358/467; 358/468; 355/200; 355/209
[58] Field of Search ............... 358/400, 403, 404, 406, 358/467, 468, 442, 443; 379/100; 355/204, 206, 209, 200, 202, 203

[56] References Cited

U.S. PATENT DOCUMENTS 4,970,554 11/1990 Rourke ........................... 355/200
5,124,748 6/1992 Tanabe et al. .................. 355/203

Primary Examiner—Edward L. Coles, Sr.
Assistant Examiner—Jerome Grant, II
Attorney, Agent, or Firm—Staas & Halsey

[57] ABSTRACT

An electronic filing system, for example, wherein a plurality of stored documents are distributed in accordance with the contents thereof. Guide lines are provided on the borders of the distributed documents, and the guide lines are displayed. A method for displaying amount of documents in the electronic filing system comprises a step of determining the state of respective guide lines in response to the number of documents collected together and having the same classification. By using this method, searching for or management of documents can be carried out easily.

12 Claims, 21 Drawing Sheets

| FIRST GUIDE | SECOND GUIDE | FOLDER | NUMBER OF DOCUMENTS |
|---|---|---|---|
| A-1 | B-1-1 | C-1-1-1 | 2 |
| | | C-1-1-2 | 10 |
| | | C-1-1-3 | 35 |
| | B-1-2 | C-1-2-1 | 15 |
| | | C-1-2-2 | 20 |
| A-2 | B-2-1 | C-2-1-1 | 25 |
| | | C-2-1-2 | 30 |

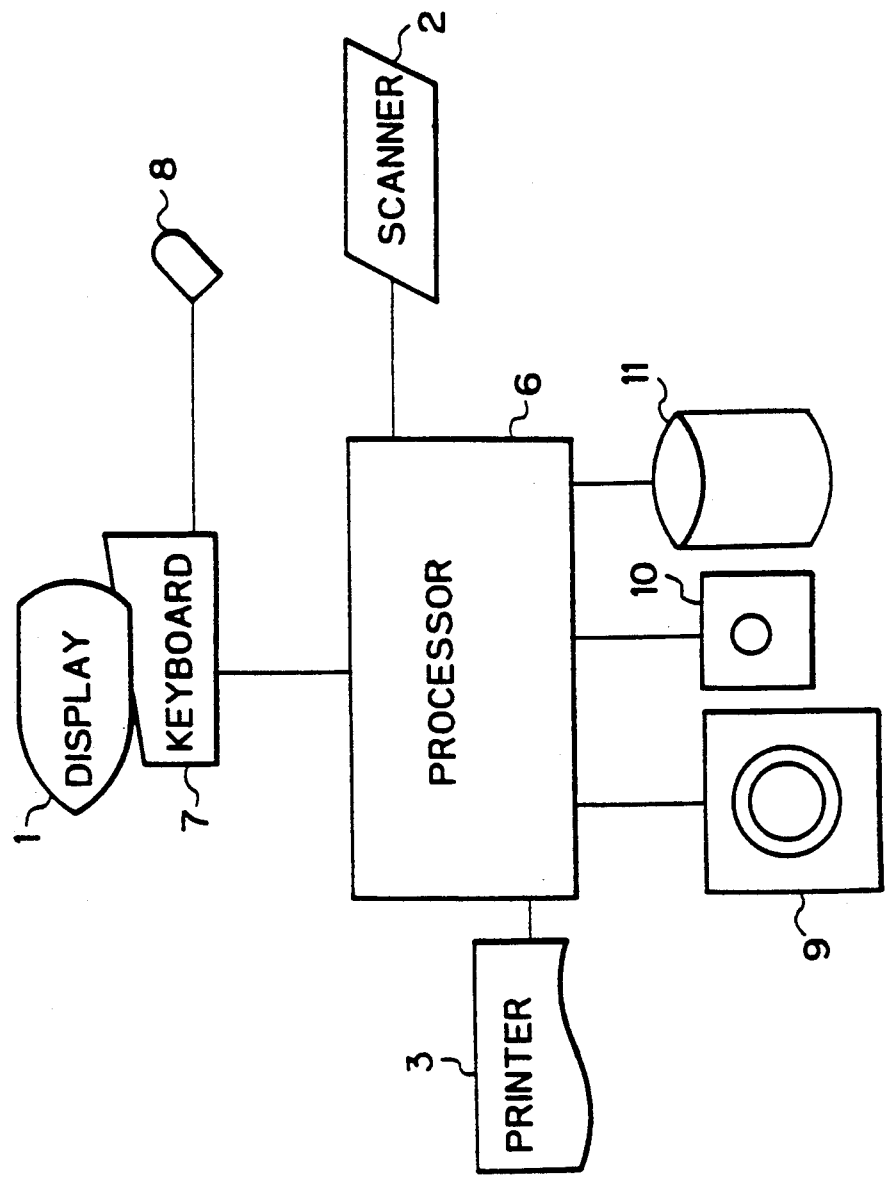

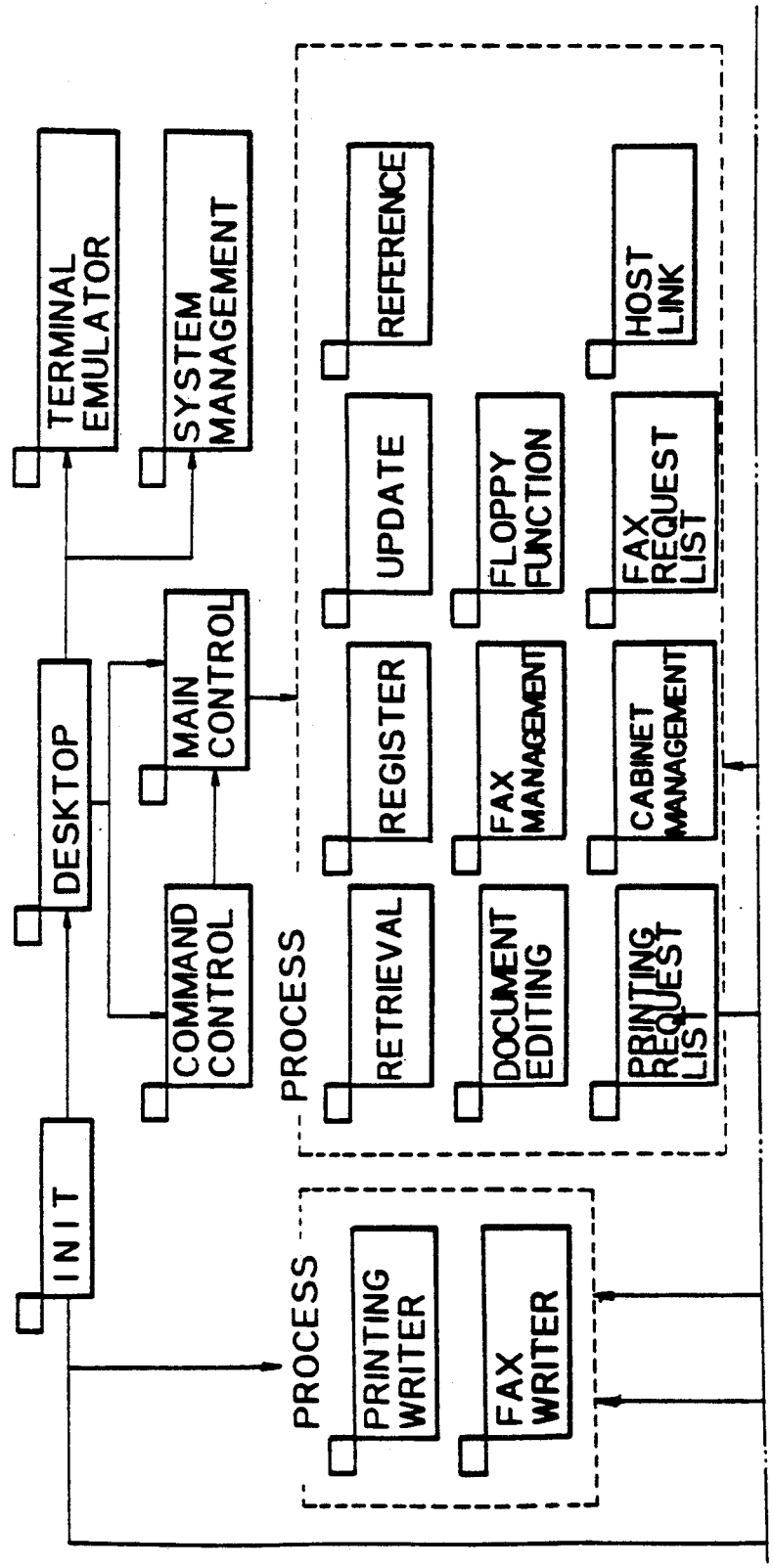

Fig. 4

| FIRST GUIDE | SECOND GUIDE | FOLDER | NUMBER OF DOCUMENTS |
|---|---|---|---|
| A-1 | B-1-1 | C-1-1-1 | 2 |
|  |  | C-1-1-2 | 10 |
|  |  | C-1-1-3 | 35 |
|  | B-1-2 | C-1-2-1 | 15 |
|  |  | C-1-2-2 | 20 |
| A-2 | B-2-1 | C-2-1-1 | 25 |
|  |  | C-2-1-2 | 30 |

Fig. 6

| | |
|---|---|
| 1 UNIQUE ID | UNIQUE NUMBER ATTACHED TO GUIDE |
| 2 GUIDE LEVEL | LEVEL OF GUIDE (e.g. A.B.C) |
| 3 GUIDE VALUE | NAME OF GUIDE |
| 4 NUMBER OF DOCUMENTS BELONGING GUIDE | NUMBER OF DOCUMENTS BELONGING TO THE GUIDE |
| 5 OTHERS | OTHER INFORMATION |

| 1 HIERARCHICAL NUMBER OF GUIDE | 3 |
|---|---|
| 2 GUIDE ITEM (1ST HIERARCHY) | FIRST GUIDE |
| GUIDE ITEM (2ND HIERARCHY) | SECOND GUIDE |
| GUIDE ITEM (3RD HIERARCHY) | FOLDER |
| 3 NUMBER OF GUIDE BELONGING DRAWER | 12 |

Fig. 17

| RANK(R) | NUMBER OF DOCUMENTS (N) | SPACE OF FOLDERS | LINE THICKNESS | HUE |
|---|---|---|---|---|
| 1 | 0 – (n – 1) | 2 | 1 | WHITE |
| 2 | n – (2n – 1) | 4 | 2 | GRAY |
| 3 | 2n – (3n – 1) | 6 | 3 | DARK BLUE |
| 4 | 3n – (4n – 1) | 8 | 4 | BLUE |
| 5 | 4n – (5n – 1) | 10 | 5 | PURPLE |
| 6 | 5n – (6n – 1) | 12 | 6 | LIGHT BLUE |
| 7 | 6n – (7n – 1) | 14 | 7 | GREEN |
| 8 | 7n – (8n – 1) | 16 | 8 | YELLOW-GREEN |
| 9 | 8n – (9n – 1) | 18 | 9 | YELLOW |
| 10 | 9n – (10n – 1) | 20 | 10 | ORANGE |
| 11 | 10n – | 22 | 11 | RED |

METHOD FOR DISPLAYING AMOUNT OF DOCUMENTS

BACKGROUND OF THE INVENTION

1. Field of the Invention

The present invention relates to a method for displaying guide lines (partition) which show a storage state of documents divided by contents in, for example, an electronic filing system.

2. Description of the Related Art

First, terms used in this specification and claims are explained as follows.

(A) Guide line: In a filing system to which the present invention is applied, documents to be managed are classified in accordance with a classification system, in which a classified border and partition are inserted. When the classification state is displayed on the screen of, e.g., a cathode ray tube, the border line corresponding to the partition is called a "guide line".

(B) Guide: A domain between guide lines is called a "guide" or "guide domain". The guide domain is used when the area of the guide is emphasized.

(C) Rank: A group of documents classified by a partition are referred to by "rank", e.g., 1 to 10 in accordance with the respective number of documents.

(D) Mouse: A mouse is an input device in a data processing system. By the operation thereof, a display on the display screen is controlled.

Generally, in a filing system a plurality of documents are classified and stored, e.g., in a tree configuration in accordance with the contents, and thus the selection and retrieval of the necessary documents can be easily effected.

Also, in an electronic filing system, it has been considered that a display screen be partitioned by guide lines in accordance with the kind of documents concerned to give a feeling similar to files stored in a drawer.

Selecting of a guide or folder is accomplished by pushing the left side key on a mouse in the system. An inhibit operation of the selected folder is executed by pushing the right key on the mouse, the folder being the lowest hierarchical classification.

On the display screen, the selected folder is shown by inverted letters in black and white. The guide structure is a hierarchical structure, and therefore, when all the guides belonging to a particular higher guide are selected, the higher guide is also selected and the expression thereof is executed by the inverted letters in black and white. The total number of documents belonging to the folder shown by inversion is displayed on the display screen. The total number of documents is renewed in accordance with the mouse operation simultaneously with a renewal of the display.

In the above related art, there is a problem that a number of documents belonging to a folder containing several documents cannot be found immediately.

SUMMARY OF THE INVENTION

An object of the present invention is to provide a way to easily search for or manage documents by changing the state of the guide lines in response to the number of documents belonging to the guide.

In the present invention there is provided a system wherein a plurality of stored documents are distributed in accordance with the contents thereof, guide lines are provided on the borders of the distributed documents and the guide lines are displayed on the display screen. A method for displaying an amount of documents comprises a step of determining the state of respective guide lines in response to the number of documents collected together and having the same classification.

BRIEF DESCRIPTION OF THE DRAWINGS

FIG. 2 is a block diagram of the system of FIG. 1;

FIGS. 3A, 3B and 3C are block diagrams of the construction and control flow of the system of FIG. 1;

FIG. 4 is a diagram explaining hierarchical guides;

FIG. 6 is a diagram explaining an information form for a guide in a data base;

FIG. 7 is a diagram for of data related to a guide display in a data base;

FIG. 8 is a diagram explaining one drawer of information;

FIG. 17 is a diagram showing a relationship between a number of documents and guide line spacing, guide line thickness, and guide hue as examples of the embodiments;

DESCRIPTION OF THE PREFERRED EMBODIMENTS

Prior to explaining embodiments of the present invention, related art will be explained with reference to the drawings. First, a summary of an electronic filing system to which this invention is preferably applied is explained with reference to FIGS. 1 to 3.

Figure 1:
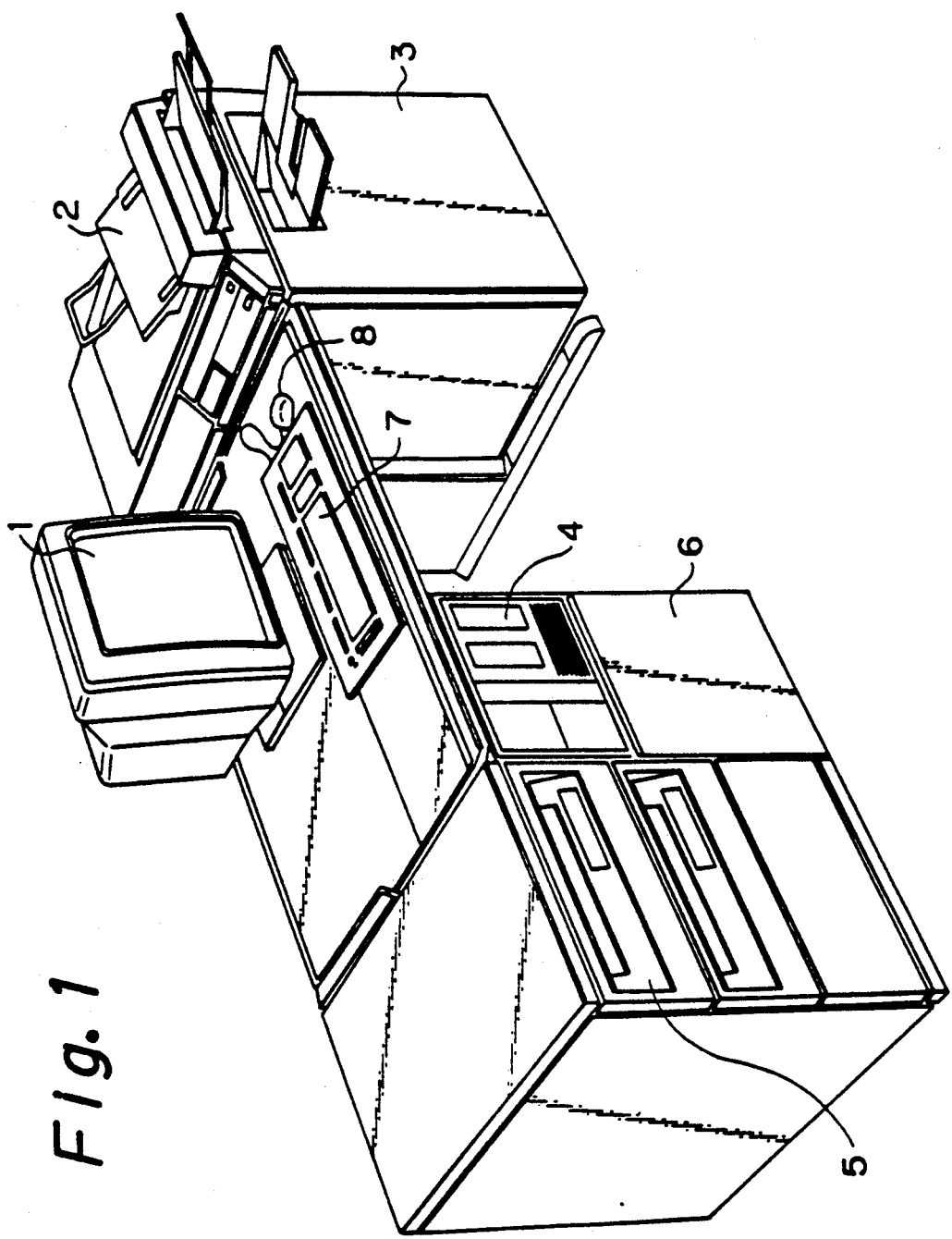
FIG. 1 is a perspective view of an electronic filing system using a method according to the present invention.

FIG. 1 is a perspective view of this system. Display device 1 is a device for displaying documents stored in this system. A scanner device 2 is a device for storing input image data. A printing device 3 (e.g., laser beam printer) prints and outputs the stored documents. A 5.25 inch optical disk device 4 and a 12 inch optical disk device 5 store the documents. A processor 6 manages a controller and data base in the system. A keyboard 7 is a device for inputting letters, etc. A reference numeral 8 is a mouse.

FIG. 2 is a block diagram of the system of FIG. 1. An optical disk 9 shown in the drawing includes the 5.25 inch optical disk device 4 and the 12 inch optical disk device 5 in FIG. 1. Memory devices 10 and 1 are a floppy disk and a direct access storage device which is a random access memory, respectively.

Figure 3B:
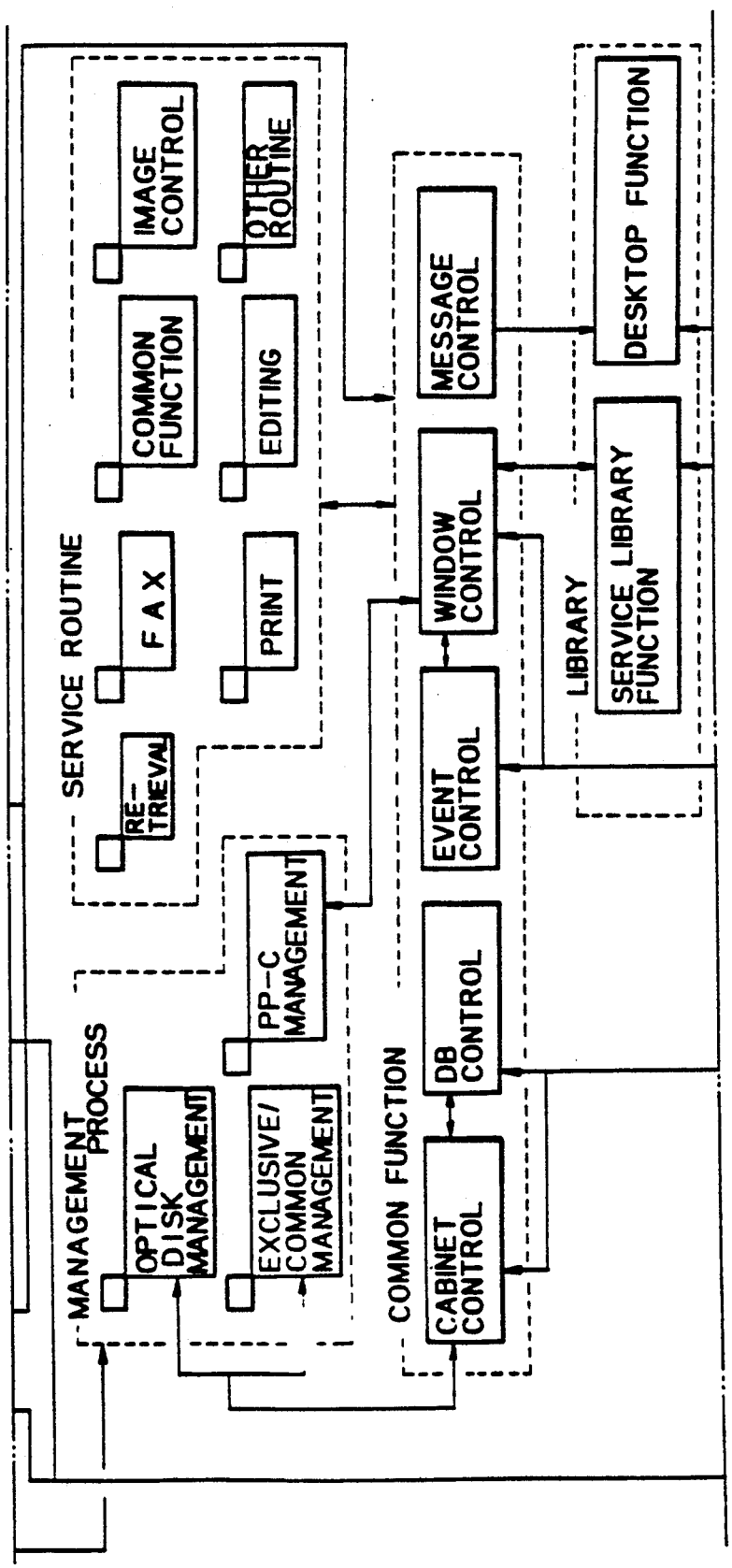
Figure 3C:
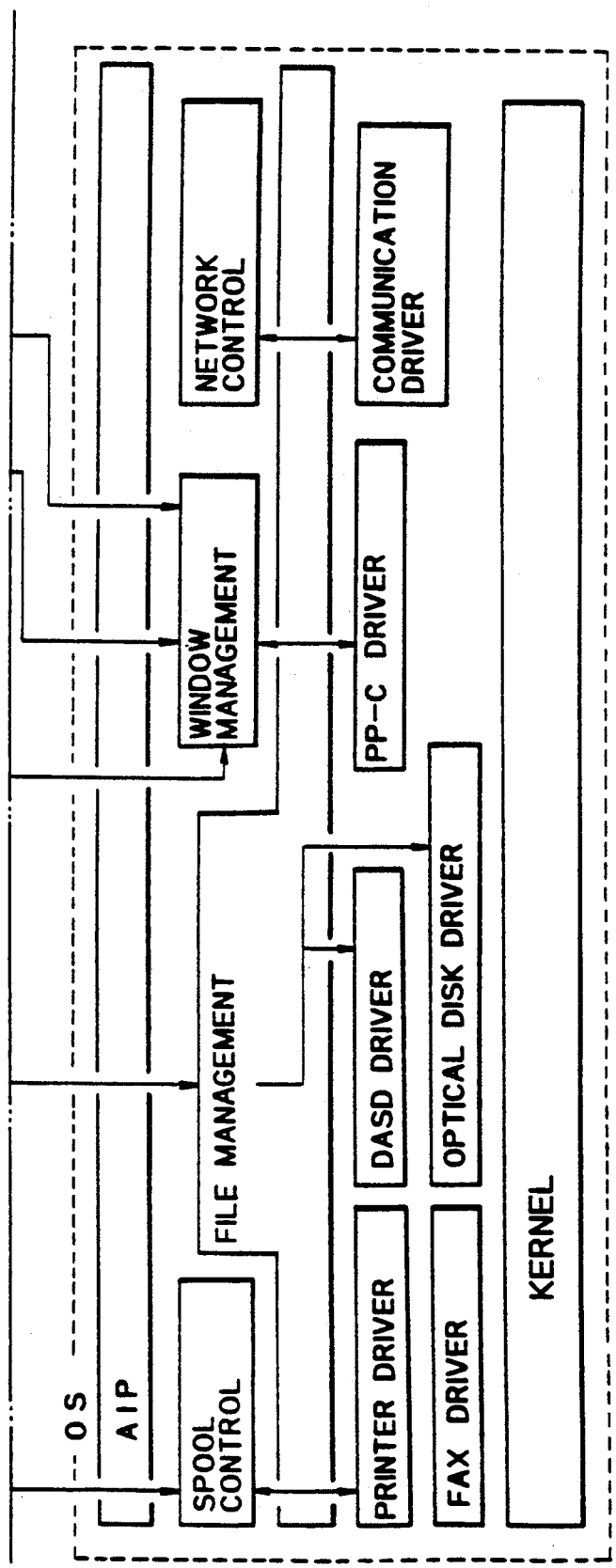

FIG. 3 is divided into FIG. 3A, FIG. 3B and FIG. 3C and is a block diagram of the electronic filing system.

The electronic filing system executes storage of documents, and retrieval, reference, and printing of the stored documents using the optical disk. The register (store) of the documents to the optical disk can be carried out by an operation similar to a copy machine. When the documents are registered, the title of the document, the data registered, a keyword, and the like are stored simultaneously.

To retrieve an object document needed by a user from the many registered documents, the following or a similar method is used. The object domain is narrowed on a one by one basis from large to small classification, as if proceeding from a trunk to the leaves of a tree, or information on individual documents can be utilized by a so-called keyword retrieval. After locating the document, various operations (reference, printing, etc.) can be carried out.

The classification structure of the documents is explained next with reference to FIG. 4. The necessary data for displaying a guide list is shown in FIG. 4 as a data format example. For example, document files are stored in the respective allotted folders C-1-1-1, . . . , C-1-2-1, . . . , C-2-1-1. If C-1-1-1, C-1-1-2, and C-1-1-3 belong to the same classification or are relevant to each other, they are collected together as a second guide for example, B-1-1. Further, if documents belonging to the second guides B-1-1 and B-1-2 have the same classification or are relevant to each other, these are collected together as a first guide A-1, and then the documents are stored by a three step hierarchical structure.

Figure 5:
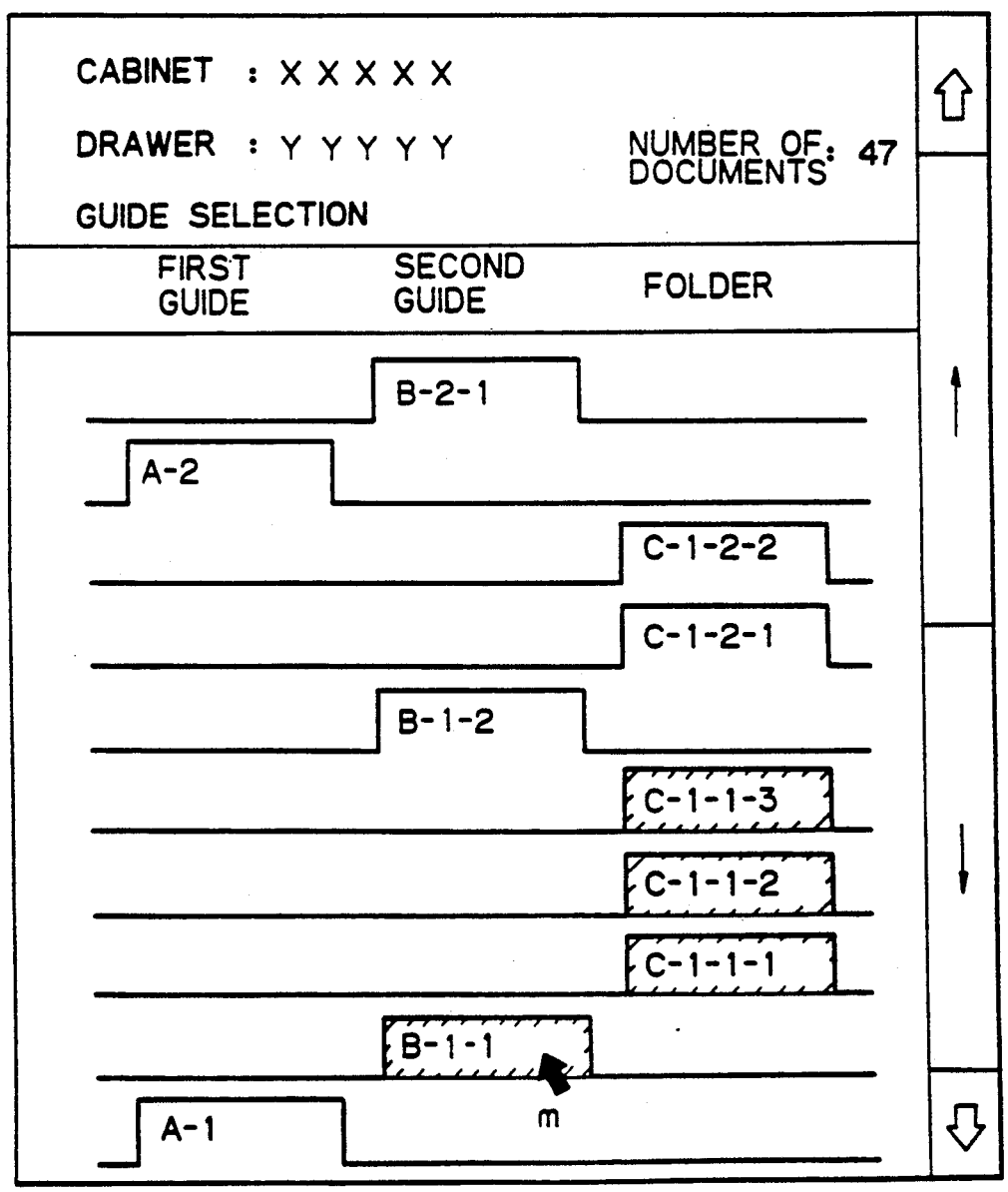
FIG. 5 is a diagram explaining a conventional method for displaying documents in the hierarchical guide.

In FIG. 5, a conventional example of display in the electronic filing system wherein documents having the structure shown in FIG. 4 are filed, is shown. This display simulates actual document files stored in a drawer. Lines having an upwardly projecting portion at the left side of the display represent first guides A-1 and A-2 which show the first hierarchical group, lines having a projecting portion at the center of the display represent second guides B-1-1, B-1-2, and B-2-1 which show the second hierarchical group, and lines having a projecting portion at the right side of the display represent folders C-1-1-1, C-1-1-2, C-1-1-3, C-1-2-1 and C-1-2-2, namely, a total of three kinds of partitions (guide lines) are displayed.

In the upper portion of FIG. 5, labels "FIRST GUIDE", "SECOND GUIDE", and "FOLDER" are displayed corresponding to the above-mentioned projecting portions. In addition, in the upper portion of FIG. 5, a cabinet name indicating a cabinet in which these the number of documents files are stored, a drawer name, and document belonging to the drawer are shown. In the lower portion of the figure, the black arrow m is an on-screen pointer manipulated by a mouse.

The document number for the drawer of FIG. 5 is 47 which is the total number of documents belonging to the drawer.

White arrows at the right side of the display screen show a designated domain for page renewal or for a large degree of scrolling when the mouse so designates. Fine arrows show a designated domain for a small degree of scrolling compared with the white arrows.

When the above folders C-1-1-1, C-1-1-2, C-1-1-3, C-1-2-1, and C-1-2-2, for example, are designated by the mouse, it is preferable that the data showing the contents of the document as the title of the document belonging to the folder, be displayed at a convenient point on the display screen.

In addition, the folders identified by slanted lines, namely the folders C-1-1-3, C-1-1-2 and C-1-1-1, and the second guide B-1-1 are currently selected and the letters are actually inverted from black to white and from white to black compared with the other folders.

The information concerning guides used as a data base has a form shown in FIG. 6. Also, the construction of guide display data as a data base, is as shown in FIG. 7. Further, the information relating to guides in the drawer is shown in FIG. 8.

Figure 9:
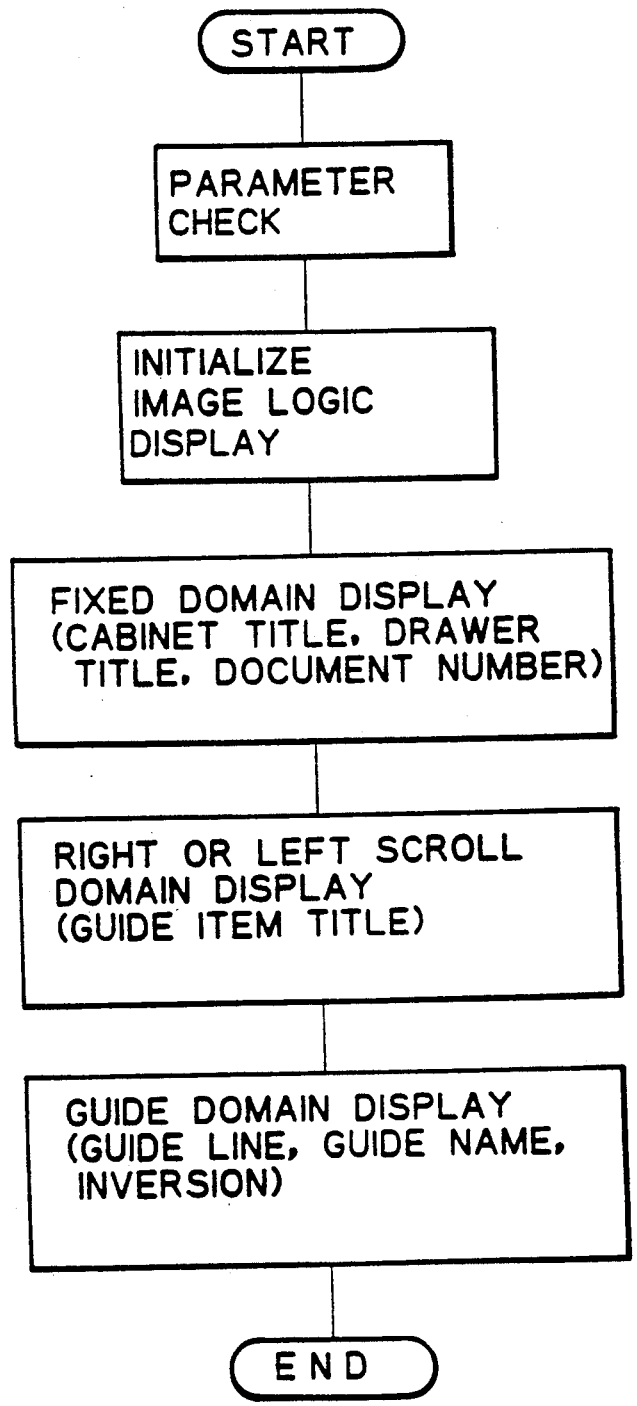
FIG. 9 is a flowchart of a display control for displaying a guide state in the system of FIG. 1.
Figure 10:
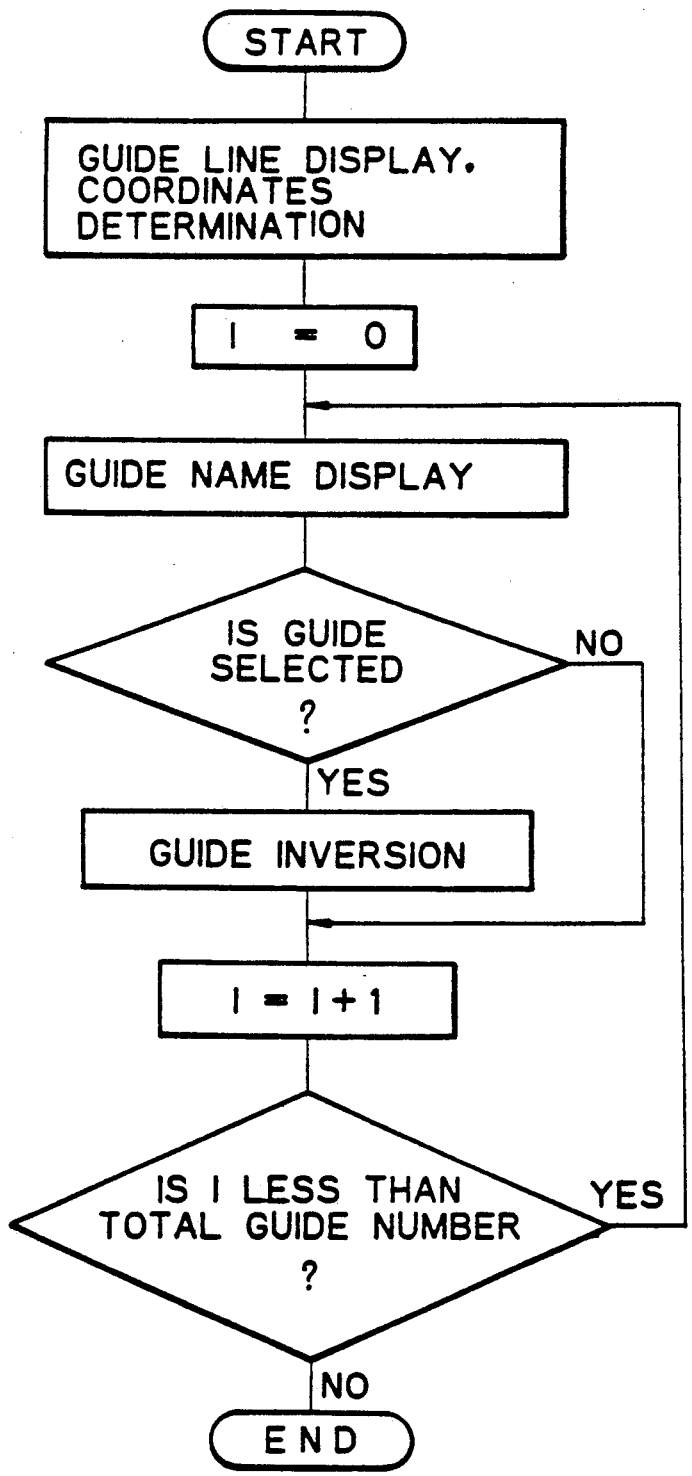
FIG. 10 is a flowchart display a guide domain in the flowchart of FIG. 9.

In FIG. 9, the process for displaying the guide list is shown in the form of a process flowchart. In FIG. 10, a flowchart showing a display process of the guide domain display according to the present invention is illustrated.

Figure 11:
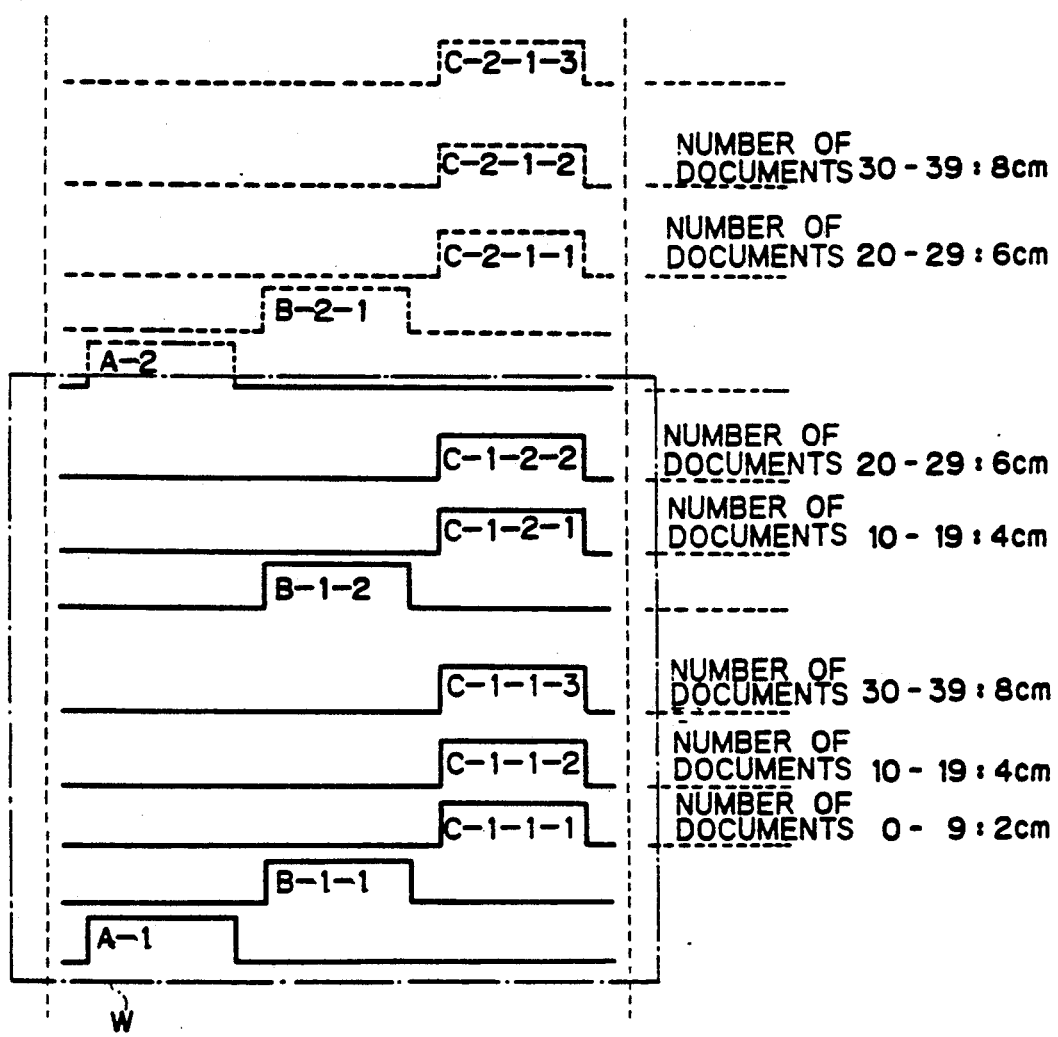
FIG. 11 is a diagram of an image displayed by the method for displaying a number of documents according to a first embodiment of this invention.
Figure 12:
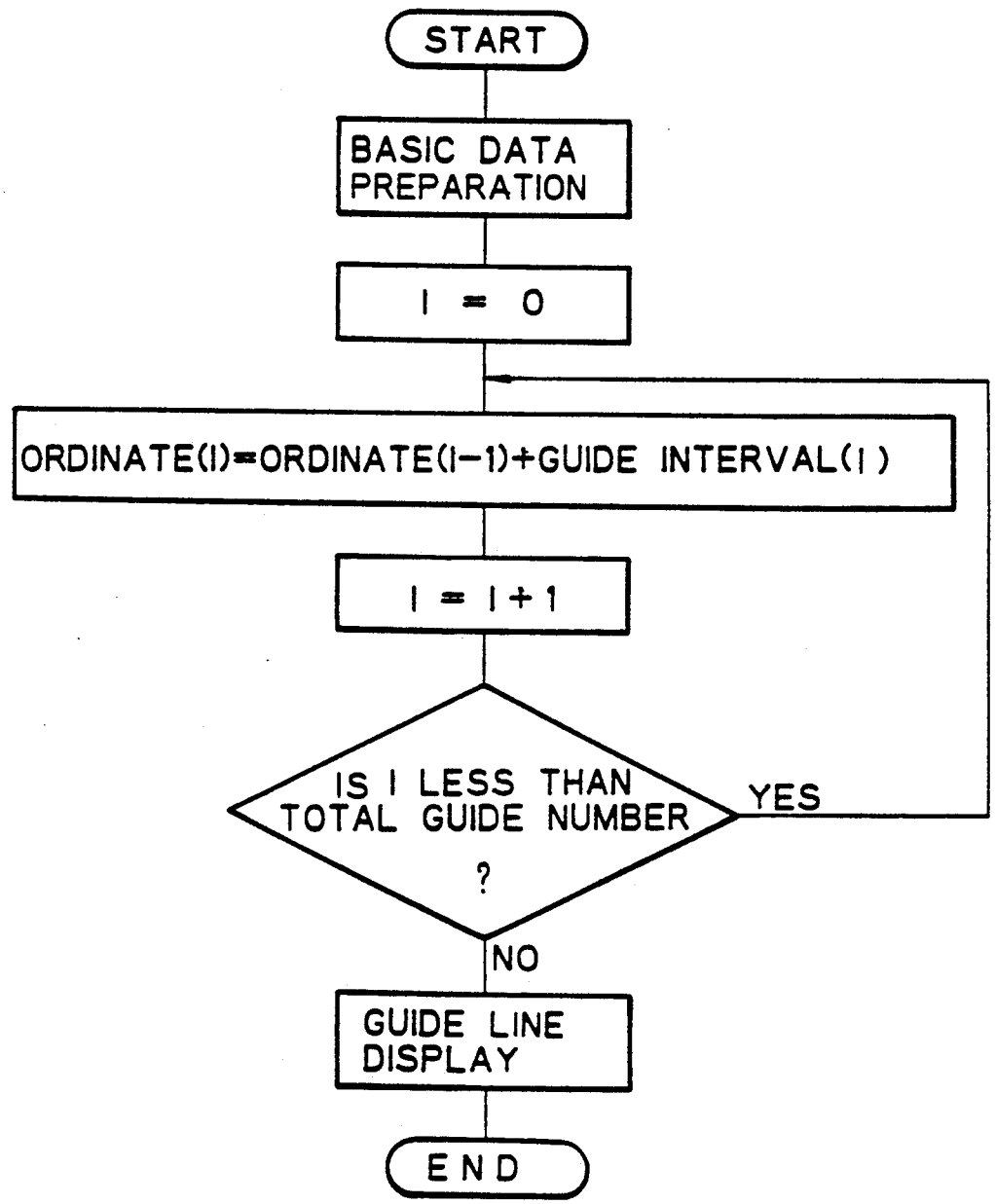
FIG. 12 is a flowchart of a process of the embodiment of FIG. 11.

In FIG. 11, an example of display using a method for displaying an amount of documents according to a first embodiment of the present invention is shown. FIG. 12 is a flowchart of a process for executing the method in FIG. 11. In the method according to this embodiment, the width of folders are changed in response to the number of the documents. This process is executed by the following steps. That is, in the step of determining the ordinate of the border line of the folder, the parameter for the ordinate is given as a value in response to the number of documents. This step is applied to all the borders of the folders.

Figure 13:
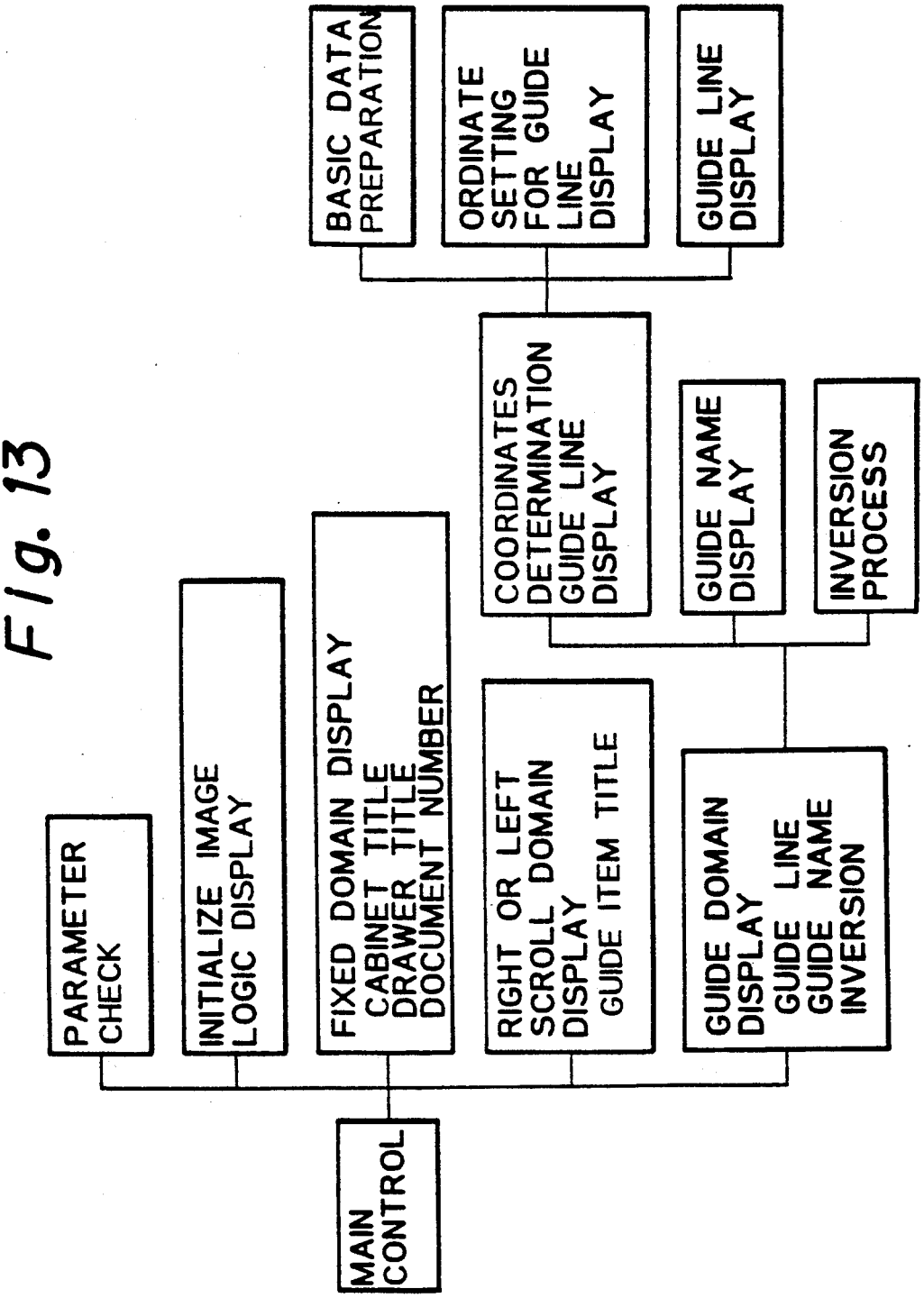
FIG. 13 is a block diagram of a display control of the embodiment of FIG. 11.

A block diagram of the display control according to this embodiment is shown in FIG. 13. A main control controls a parameter check, an initialization of an image logic display, a fixed domain display, a right or left scroll domain display, and a guide domain display. In this description, only the guide domain display is explained and the others are abbreviated because the invention does not concern the other.

In FIG. 11, an example of the guide display using the method according to the present invention is shown, wherein the spacing of the folders is determined as shown in FIG. 17 and the constitution of the documents is as shown in FIG. 4. In FIG. 17, n is an arbitrary positive integer designated by the user.

Concretely, both the first guide, e.g., A-1 and the second guide, e.g., B-1-1 do not store the documents, therefore, it is preferable that the space between the first guide and the second guide be a constant minimum value, e.g., 2 cm.

Since the number of documents belonging to the folder C-1-1-1 is 2 in the example, the spacing of this folder is 2 cm with reference to FIG. 17 using n=10. Since the number of the documents belonging to the folder C-1-1-2 is 10, the spacing of this folder is 4 cm. The spacing of the folder C-1-1-3 before the next second guide B-1-2 is 8 cm because 35 documents belong to the folder C-1-1-3. Other spacings and the corresponding number of documents are indicated on the right side of FIG. 11.

The ratio between the above interval and the number of documents is not limited by these examples.

In FIG. 11, a window W is shown by a dot-dashed line. The entire domain enclosed by this dot-dashed line is displayed on the screen, however, by an up or down scrolling of the mouse, the window displayed on the screen moves up and down equivalently to reveal the upper and lower portions of the display domain.

Figure 14:
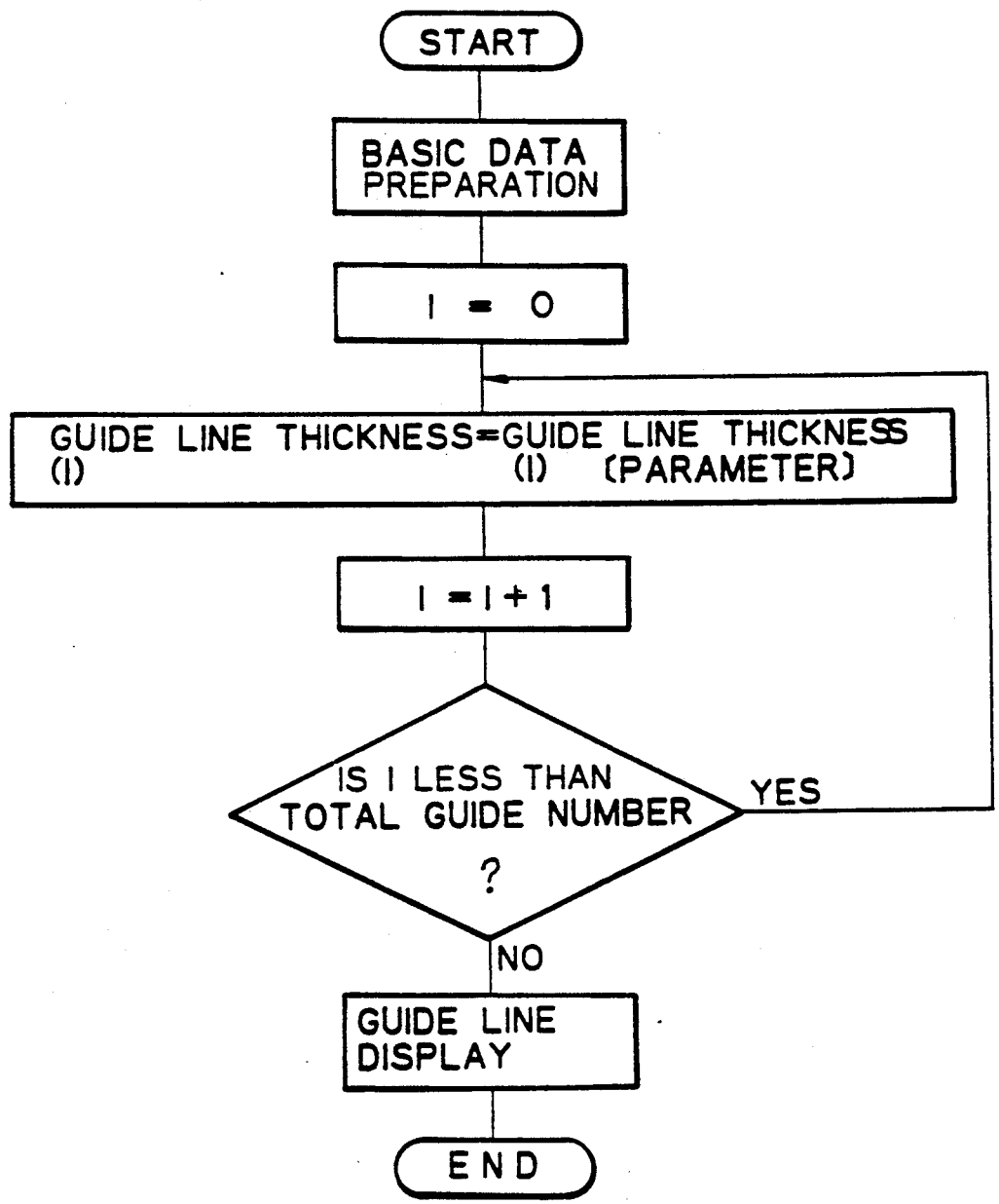
FIG. 14 is a flowchart of a process of the second embodiment of the invention.

A flowchart showing a process of a second embodiment is shown in FIG. 14. In this embodiment, the thickness of the border line of the folder is changed in response to the number of documents. This process is executed in a guide line thickness determination process. That is, as a parameter, a value is calculated corresponding to the number of documents, and the border line of the folder having a thickness corresponding to the number of documents is determined. The block diagram for display control in this second embodiment is the same as FIG. 13.

Figure 15:
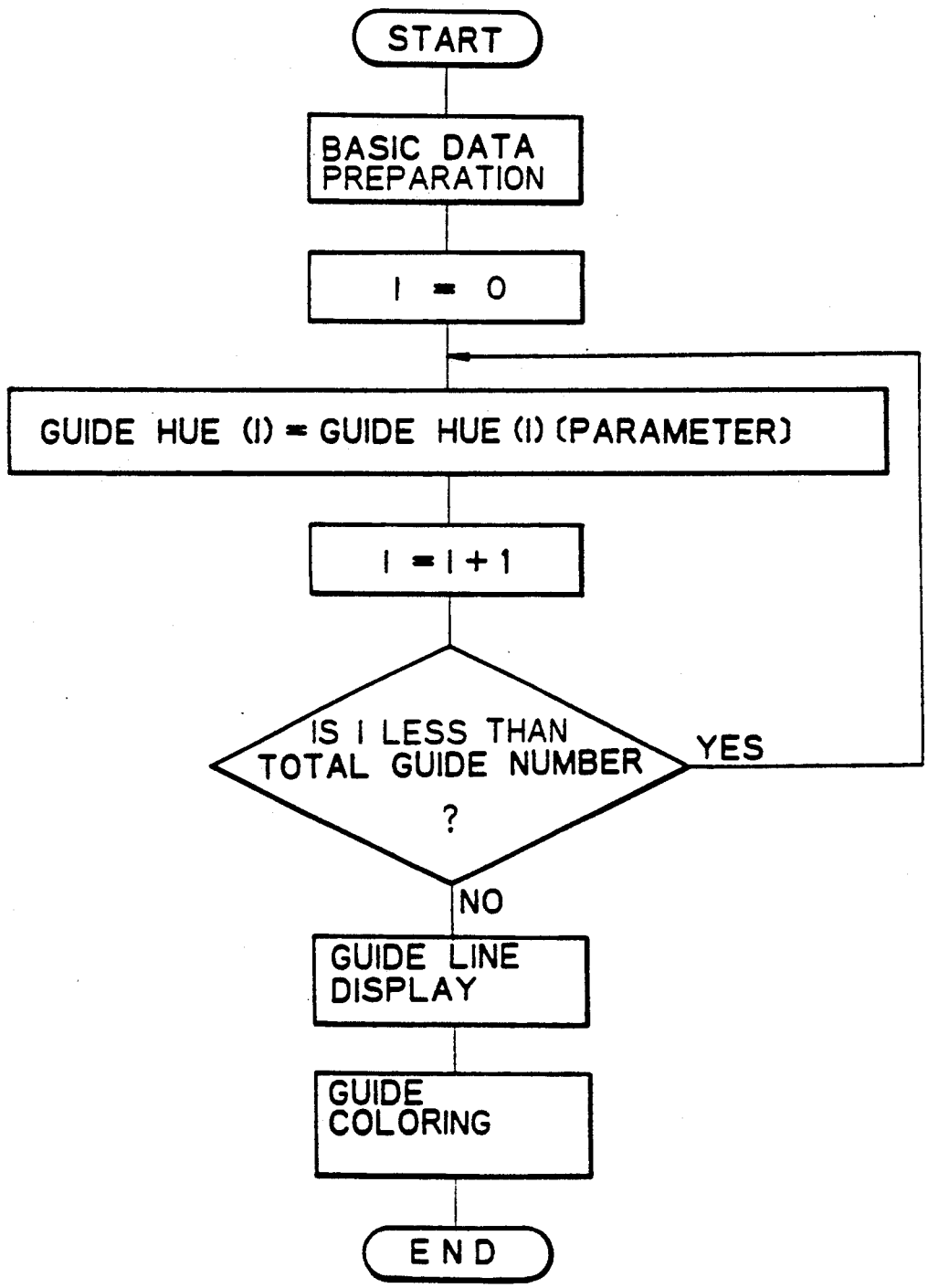
FIG. 15 is a flowchart of a process of the third embodiment of the invention.
Figure 16:
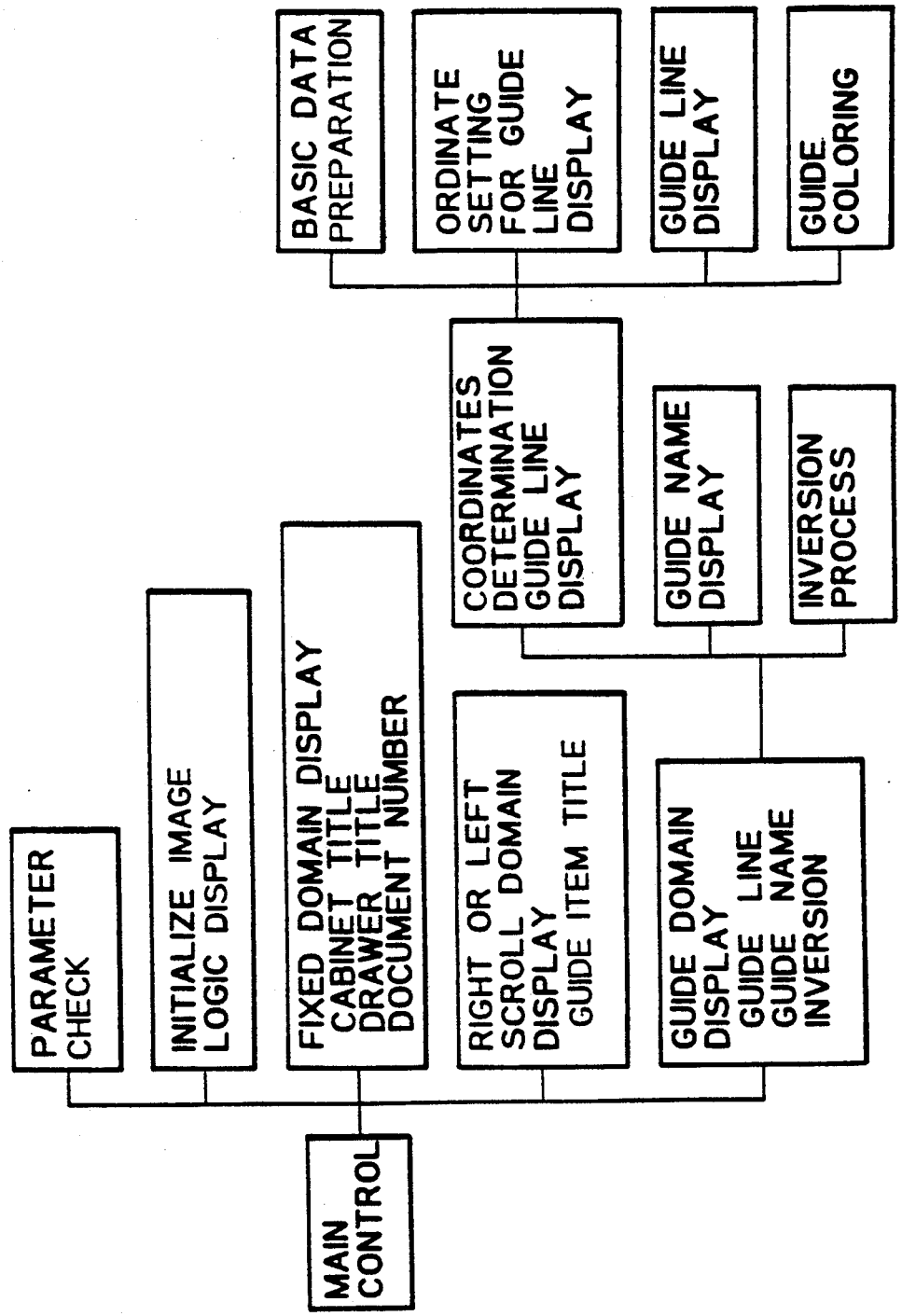
FIG. 16 is a block diagram of a display control of the embodiment of FIG. 15.

A flowchart of a method for displaying an amount of documents according to a third embodiment of the invention is shown in FIG. 15. In this process, a third process step changes the hue of a folder in accordance with the number of the documents. An example of this hue allotment is shown in FIG. 17. Also, a block diagram of the display control in this embodiment is shown in FIG. 16. In FIG. 16, only a color attaching process block is added to the block diagram of FIG. 13.

Figure 18:
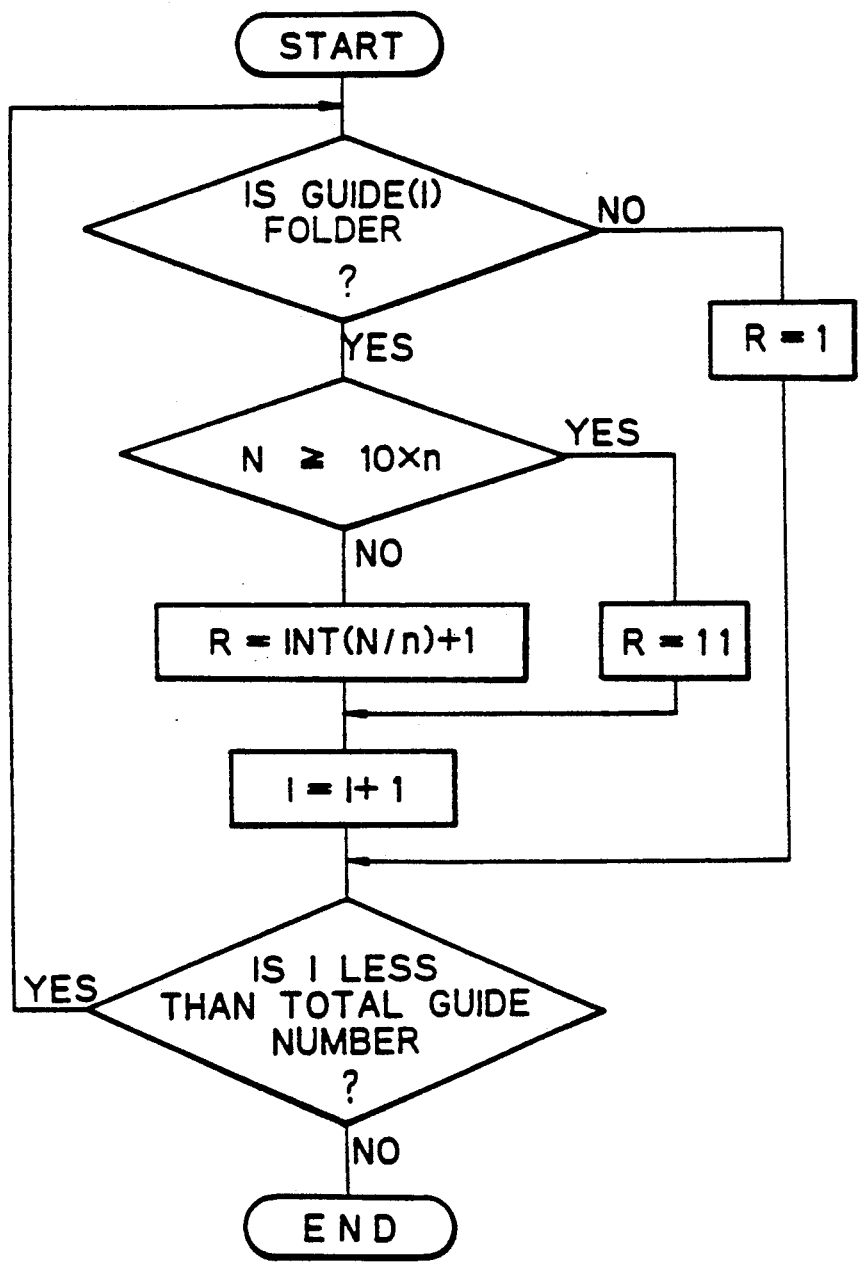
FIG. 18 is a flowchart showing a process for obtaining rank (R) corresponding to number of documents.
Figure 19:
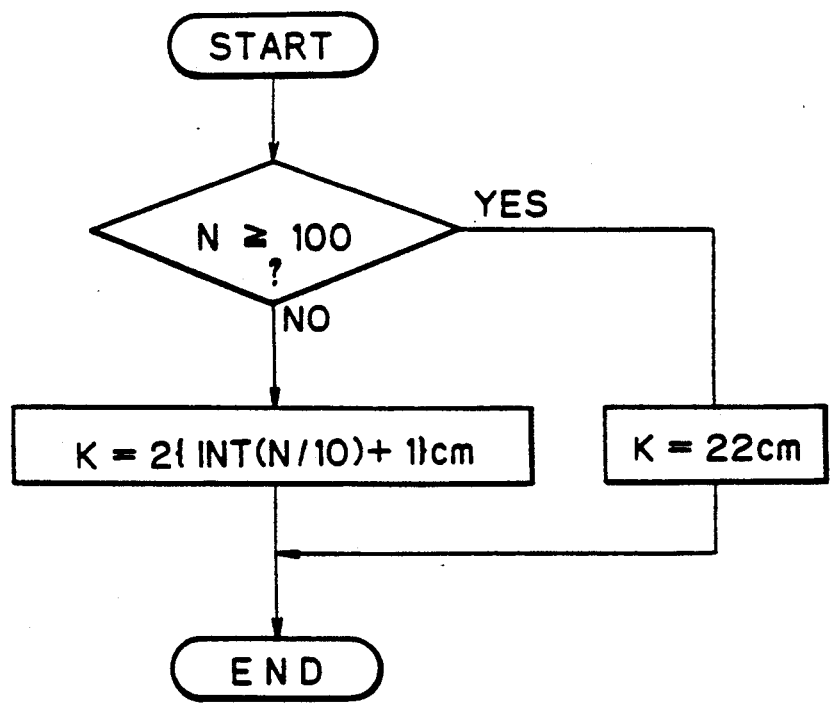
FIG. 19 is a flowchart of a process for calculating a definite interval in FIG. 18.

Next, FIG. 17 will be explained. In FIG. 17, an example wherein the number of the documents (N) is divided into eleven ranks is shown. Namely, at the left side, ranks (R) 1 to 11 are shown and the number of documents (N) corresponding to the ranks are shown in the next column. In the number of the documents (N) columns, n is an arbitrary positive integer selected by the user. The thickness of the folder can be expressed, for example, as twice the rank number in centimeters. The thickness of the guide line can be expressed as the same number as the respective rank in millimeters. The hue of the guide can correspond to the hues from white to red noted in the column labelled hue. The above ranking can be obtained by the process illustrated in the flowchart of FIG. 18. That is, if the guide (I) is not a folder, the guide spacing is given the minimum rank, and if the number of documents (N) is larger than 10n, the rank is 11. INT (N/n) refers to the integer portion of the quotient (N/n). These processes are applied to all the guides and the rank of all the guides are obtained. In FIG. 19, a flowchart wherein the folder intervals in FIG. 17 are obtained is shown. First, the number of documents is examined to determine whether there are more than 99 or not, and if the number of documents is more than 99, interval (K) is set to the maximum, i.e., 22 cm. If the document number is less than 100, the document number is divided by 10, 1 is added to the integer part of the quotient, and the sum is multiplied by 2 cm. The result is the folder interval (K). By using this method according to the present invention, since the spacing of folders is proportional to the amount of documents, the number of documents belonging to the folder can be shown by the folder display. Accordingly, document management can be carried out in a similar manner as in a typical filing system. Further, with reference to the displayed amount of documents, an object document can be searched for and the special effect by which the division of a folder including a large amount of documents is executed, is achieved. The foregoing is considered as illustrative only of the principles of the invention. Since numerous modifications and changes will readily occur to those skilled in the art, it is not desired to limit the invention to the exact construction and application shown and described, and accordingly, all suitable modifications and equivalents may be resorted to, falling within the scope of the invention and the appended claims and their equivalents.

I claim:

1. A method for displaying an amount of documents in which a plurality of stored documents are distributed in accordance with contents thereof, guide lines are provided on borders of the distributed documents, and the guide lines are displayed on a display screen, said method comprising the steps of:
   (a) determining a state of respective guide lines in response to a number of documents collected together which have a same classification; and
   (b) displaying the guide lines with a thickness thereof, a spacing therebetween or a hue therebetween which is proportional to the state determined in said step (a) said step (b) comprises the substep of:
      i) displaying the guide lines with a change in spacing between the guide lines which is proportional to the state determined in said step (a);
   the spacing between guide lines is incrementally variable by multiples of a folder interval, the folder interval being set at either a first predetermined interval value or a second predetermined interval value depending on whether a number of documents is above or below a threshold, respectively.

2. A method for displaying an amount of documents in which a plurality of stored documents are distributed in accordance with contents thereof, guide lines being provided on borders of the distributed documents and the guide lines being displayed on a display screen, said method comprising the steps of:
   (a) selecting a plurality of documents stored by classification in a tree-like hierarchical structure;
   (b) determining a number of documents having the same classification; and
   (c) expressing guide lines of the selected documents by a change in spacing between the guide lines, the spacing between the guide lines being incrementally variable by multiples of a folder interval, the folder interval being set at either a first predetermined interval value or a second predetermined interval value depending on whether the number of documents in each classification is above or below a threshold, respectively.

3. A method of displaying guide lines used on borders of documents to encode micro features representative an associated document, said method comprising the steps of:
   (a) determining a series of guide lines to be successively displayed;
   (b) determining a number of documents represented by the guide lines to be successively displayed;
   (c) altering a macro feature of the guide lines to be successively displayed based on the number of documents represented by the guide lines; and
   (d) successively displaying on a display screen the altered guide lines.

4. A method of displaying according to claim 3, wherein said step (c) comprises the substep of (c1) altering a macro feature including a hue of the guide lines to be displayed based on the number of documents represented by the guide lines.

5. A method of displaying according to claim 3, wherein said step (c) comprises the substep of (c1) altering a macro feature including a spacing between the guide lines to be displayed which is proportional to the number of documents represented by the guide lines.

6. A method of displaying according to claim 5, wherein said substep (c1) further comprises the substep of (c1i) incrementally varying the spacing between the guide lines by multiples of a folder interval, the folder interval being set at either a first or second predetermined interval value depending on whether the number of documents represented by a guide line is above or below a threshold, respectively.

7. A method of displaying according to claim 5, wherein said substep (c1) further comprises the substep of (c1i) altering a macro feature including a hue.

8. A method of displaying according to claim 3, wherein said step (c) further comprises the substep of (c1) altering a macro feature including a size of the guide lines to be displayed which is proportional to the number of documents represented by the guide lines.

9. A method of displaying according to claim 8, wherein said substep (c1) further comprises the substep of (c1i) altering a macro feature including a thickness.

10. A method of displaying according to claim 9, wherein said substep (c1) further comprises the substep of (c1i) altering a macro feature including a hue.

11. A method of displaying according to claim 3, wherein said step (b) comprises the substep of (b1) determining a number of documents represented by the guide lines hierarchically stored in an electronic filing system.

12. A method of displaying according to claim 11, wherein the documents are classified into folders; and
wherein said substep (b1) comprises the substep of
(b1i) determining the number of documents in a folder.

* * * * *

UNITED STATES PATENT AND TRADEMARK OFFICE
CERTIFICATE OF CORRECTION

PATENT NO. : 5,255,104
DATED : OCTOBER 19, 1993
INVENTOR(S) : YASUHIRO KAJIGAYA

It is certified that error appears in the above-identified patent and that said Letters Patent is hereby corrected as shown below:

Col. 1, line 8, "(partition)" should be --(partitions)--;
       line 40, "of" should be deleted.

Col. 2, line 20, "for" should be deleted;
       line 26, "display" should be --for displaying--.

Col. 3, line 4, "1" should be --11--;
       line 58, "the number of documents" should be --document--;
       line 59, "document" should be --the number of documents--.

Col. 4, line 43, "other." should be --others.--.

Signed and Sealed this

Fourteenth Day of June, 1994

Attest:

BRUCE LEHMAN

*Attesting Officer*     *Commissioner of Patents and Trademarks*